United States Patent Office 2,813,336
Patented Nov. 19, 1957

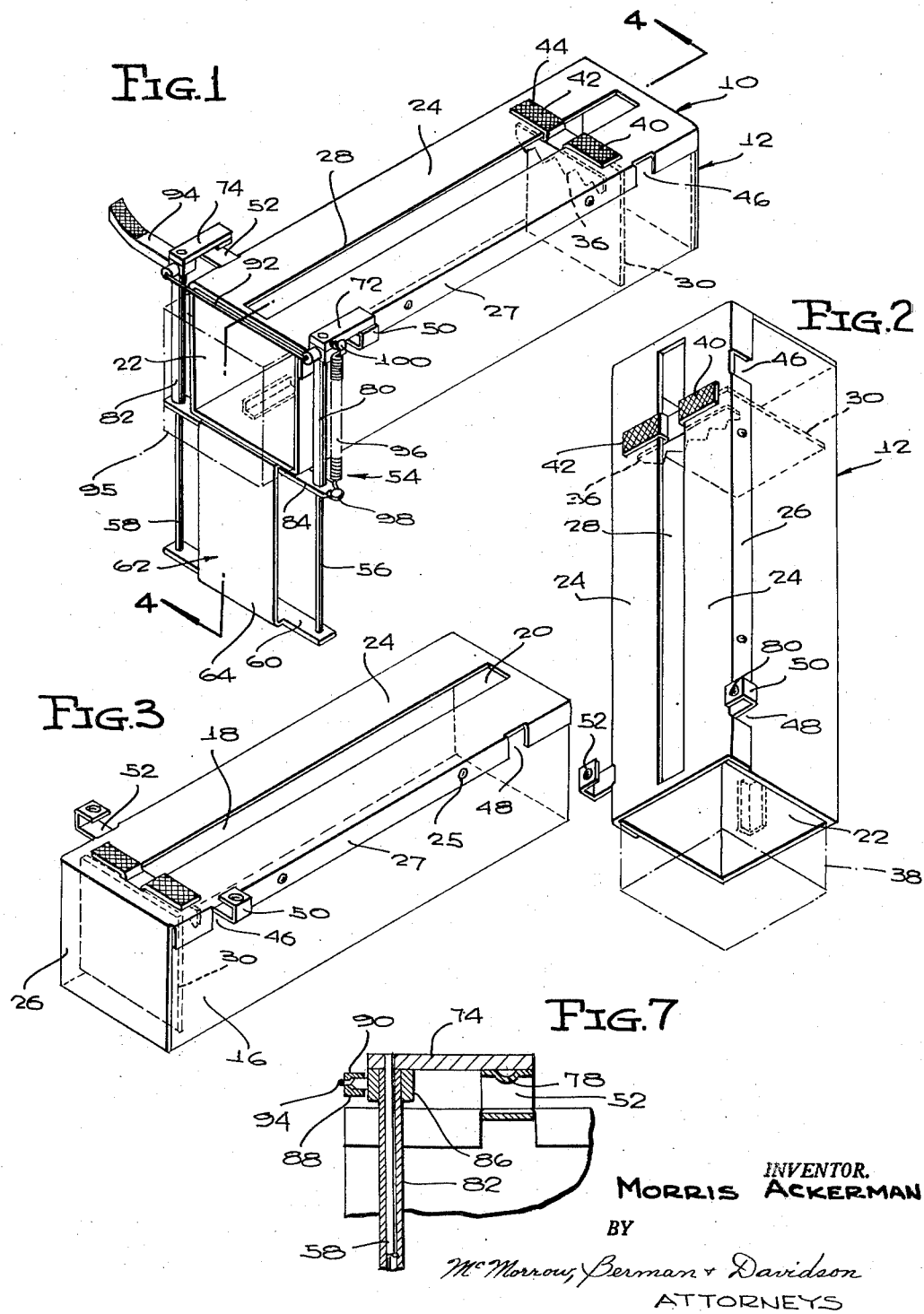

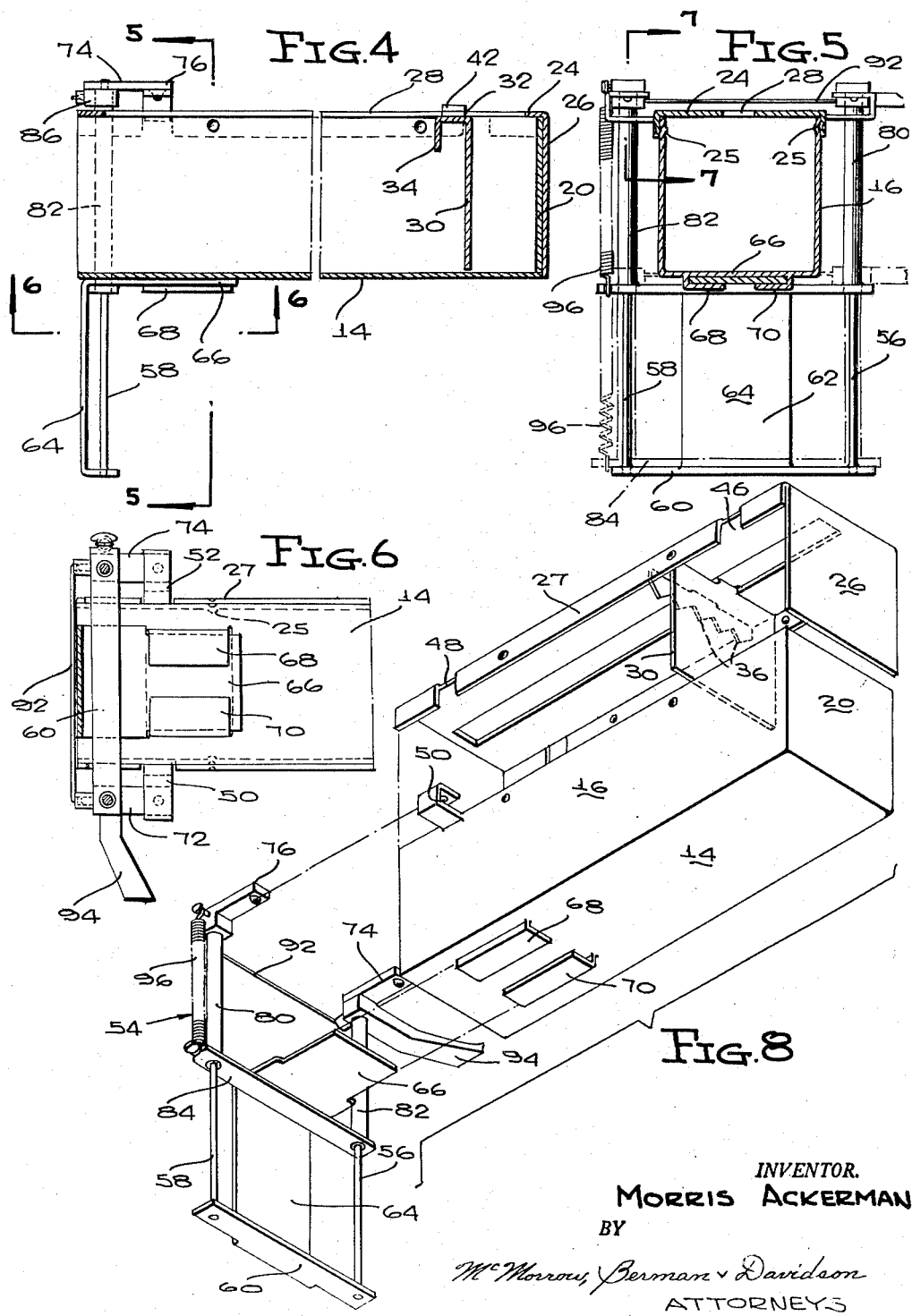

2,813,336

COMBINATION BUTTER AND CHEESE CUTTER, SERVER, AND STORER

Morris Ackerman, Bronx, N. Y.

Application November 30, 1956, Serial No. 625,427

3 Claims. (Cl. 31—22)

This invention generally appertains to improvements in devices for handling and storing dairy products and particularly relates to a novel combination butter or cheese cutter, server and storer.

The primary object of this invention is to provide a combined cutter, server and storer for butter, cheese and like products.

Another important object of this invention is to provide a container for a block of butter, cheese or the like, which container is formed or provided with means to serve as a holder for the butter during greasing operations, as a closed storage container for the butter during refrigeration, as a butter dish during table use of the butter and as a holder and container means during cutting operations.

Another important object of this invention is to provide a cutter assembly which can be detachably attached to an open end of the container and which is provided with means for easily and completely severing in one operation the protruding portion of a block of butter or cheese, which is housed in the container and moved axially thereof out through the open end by a follower means carried by the container.

Another important object of this invention is to provide a container for a block of butter or the like, the container being formed with an open end, through which the block may be moved and to which a detachable cutter means may be secured and the container being provided with a top wall, which has a depending end flange that in one position of the top wall can cover the open end of the container, so that the container can serve as a closed storage container for a block of butter.

Another object of this invention is to provide an inexpensive, simple and compact storage, server and cutter means for a cube or block of butter or a similar product.

The foregoing and ancillary objects are attained by this invention, the preferred embodiment of which is set forth in the following description and illustrated in the accompanying drawings, wherein:

Figure 1 is a perspective view of the combined butter or cheese cutter, server and storage means and showing the same assembled for use in cutting a cube or block or butter into pats;

Figure 2 is a perspective view of the container per se, showing the same assembled for use during greasing operations, such as greasing a pan, ear of corn or the like, wherein the container functions as a holder for the cube or block of butter;

Figure 3 is a perspective view of a container per se, showing the same assembled for use in storing the cube or block of butter;

Figure 4 is a longitudinal sectional view, taken on line 4—4 of Figure 1;

Figure 5 is a transverse vertical sectional view, taken on line 5—5 of Figure 4;

Figure 6 is a fragmentary horizontal, cross-sectional view taken on line 6—6 of Figure 4;

Figure 7 is an enlarged detailed, vertical sectional view taken on line 7—7 of Figure 5; and Figure 8 is an exploded perspective view, illustrating the means for detachably securing the cutter assembly to the container.

It is the primary purpose of this invention to provide a compact assembly, which can be used for many purposes in handling and storing butter or the like dairy products, such as cheese. Thus, the present invention comprehends the provision of an elongated container, which can serve three functions, namely, that of storing the cube or block of butter in a refrigerator, that of providing a holder for the cube or block of butter during greasing operations and that of providing a container and feeder for holding and feeding the cube or block of butter into a cutter assembly.

Referring now more particularly to the accompanying drawings, the combination butter cutter, server and storer 10 includes an elongated container or housing 12. The container 12 includes a bottom wall 14 and upstanding side walls 16 and 18. One end of the container is closed by an end wall 20 and the opposing end is open, as at 22. The container is provided with a detachable top wall or cover 24, which is formed on its side edges with depending side flanges 27, which are adapted to seat over the upper ends of the side walls 16 and 18 of the container, so as to locate the top wall in position. The side flanges 26 of the cover 24 and the side walls of the container are formed with snap fit locking means 25, as shown in Figure 5.

The top wall 24 is formed at one end with a depending end flange 26, which is of a width and length complemental to the width and heighth of the container.

As shown in Figure 3, the top wall 24 can be positioned over the upper open end of the container 12, so as to enclose the top and open end 22 of the container. In such position, the top wall 24 closes the open top and open end of the container, so that the stick or cube of butter in the container is substantially completely covered. Thus, the top wall 24, with its depending flange 26, complements the container 12 by enclosing the open top and open end thereof to form a butter dish, which can be used during storage of the stick or block of butter in the refrigerator.

As shown in Figures 1 and 2, the top wall 24 is formed with an axially extending slot 28, which is of relatively slight width and extends along the center of the top wall. A follower member 30, in the form of a flat plate, is positioned within the container and is of a cross-sectional shape and size complemental to the cross-sectional shape and size of a cube or block of butter, which is housed within the container. As shown in Figures 4 and 6, the upper end of the plate is formed with a horizontal flange 32, which slidably underlies the top wall 24 and extends toward the open end of the container, with the flange 26 overlying the end wall 20 of the container. A lip 34 depends from the flange 32 and is provided on its lower edge with a series of teeth 36.

As shown in Figure 2, the container 12 is employed as a holder for the cube or block 38 of butter. For such use, the block 38 is inserted into the container through the open top thereof and then the top wall 24 is placed over the top of the container, with the end flange 26 overlying the end wall 20 of the container, so that the open end 22 of the container is not enclosed. As the top wall 24 is placed over the top of the container, the teeth 36 and the lip 34 are embedded in the block 38, so that the inner end of the block is securely anchored to the follower member 30. The flange 32 of the follower member 30 is provided with arms 40 and 42, which extend through the slot 28 and are bent downwardly in opposite directions from the slot, so as to slidably overlie the upper surface of the top wall 24. The upper surfaces 44 of the arms are roughened, so as to enable the arms to be gripped in sliding the follower member forwardly in the housing to extend the cube or block 38 through the open end 22 of the housing.

Thus, the container may be held in one hand and the block of butter may be pushed outwardly through the open end 22 by placing the thumb of the holding hand on the upper surfaces 44 of the arms and pushing the follower member forwardly in the container. Since the cube or block 38 is anchored by the teeth 36 to the follower member, it will not fall out of the container as the container is held in a vertical position to apply the protruding portion of the block to a pan, for example. Of course, the container, as shown in Figure 2, can be used for many other greasing operations, such as greasing an ear of corn or the like.

It will be noted that the side flanges 27 of the cover or top wall 24 are provided, adjacent both of their ends, with cutouts 46 and 48. In this respect, the side walls 16 and 18 of the container are formed, at their upper ends, with U-shaped brackets 50 and 52. The lower legs of the brackets seat within the cutouts 48, so as to locate the cover 24 in place.

In the assembled form of Figure 3, the lower legs of the brackets 50 and 52 within the cutouts 46 to locate the cover 24 in place, with the end flange 26 overlying the open end 22 of the container.

Thus, as shown in Figures 2 and 3, the container 12 can be used to hold the block 38 for greasing or similar operations and can be used as a butter dish for storage purposes.

A cutter assembly 54 is provided and is adapted to be detachably secured to the container 12 at the open end thereof, so as to sever the portion of the block 38 which protrudes from the open end 22, as the result of the operation of the follower member 30. The cutter assembly 54 includes a pair of rod elements 56 and 58, which are disposed perpendicular to the container and arranged at the sides thereof at the open end 22. The lower ends of the rod elements 56 and 58 are connected to a transverse plate 60. A mounting block 62 is carried by the plate 60 and includes a vertical leg portion 64, which upstands from the front edge of the plate 60 and a horizontal portion 66, which is adapted to underlie the bottom wall 14 of the container. The bottom wall 14 is formed with an integral pair of spaced apart complemental angular slides 68 and 70 which provide a holder or a socket means for receiving the horizontal portion 66 of the socket 62, so as to secure the rod elements 56 and 58 to the container. It is to be particularly noted, as shown in Figure 4, that the vertical portion 64 of the bracket means is disposed in advance of the rod elements, so when the protruding portion of the block of butter is severed from the block, such severed portion will slide on the forward face of the vertical portion 64 and be prevented from coming in contact with the rod elements and their associated structure.

The upper ends of the rod elements 56 and 58 are provided with fixedly mounted arms 72 and 74, which are suitably mounted thereon and located against movement axially of the rod elements. The arms 72 and 74 are provided on their undersides at their free ends with rounded projections or detents 78 which lie below the lower surfaces of the arms and serves as detent means in attaching the arms to the brackets 50 and 52. In this respect, it will be noted that the upper legs of the brackets 50 and 52 are formed with indentations 80, within which the detents 78 are adapted to seat, as shown in Figure 7.

Thus, the cutter assembly 54 is detachably attached to the container 12 by means of the bracket 58 and associated socket means 68 and 70 and, in addition by means of the arms 72 and 74 and the brackets 50 and 52 on the upper ends of the sides of the container.

A pair of sleeves 80 and 82 are slidably disposed on the rod elements and are connected for common movement by a cross bar 84 that is secured to the lower ends thereof. The upper ends of the sleeves are formed with fixed collars 86. The collars 86 are provided with outstanding pins 88 that are adapted to receive caps 90, which secure the cutter wire 92 to the upper ends of the sleeves. In this respect, the closed ends of the caps are provided with a small aperture 94, into which the ends of the wire 92 are extended to be wedged in secured position by the pins 88. Alternatively, the ends of the wire 92 may be secured by a drop of solder within the closed ends of the caps. Thus, the caps and pins secure the wire 92 to the upper ends of the sleeves and in a position above the top of the container, so as to not interfere with the projection of the block 38 through the open end 22 of the container. A finger piece 96 laterally extends from one of the collars 86 and is provided for manual operation of the cutter. The cutter is moved downwardly across the open end 22 of the container and through the protruding portion 95 of the block 38 by manual actuation of the finger piece 94. The cutter 92 is normally retained in its position above the top of the container by a coil spring 96, which is anchored at its lower end to an extending end 98 on the cross bar 84 and anchored to a pin 100 at its upper end, the pin being carried by the arm 72.

When the device is to be used as a cutter, it can be seen that the block of butter will be inserted in the container through the top thereof and that the cover 24 will be placed in the position, as shown in Figure 1. In placing the cover over the top of a container, the inner end of the block will be gripped by the teeth 36, and will be securely attached to the follower member 30. The cutter assembly 54 is attached to the container, at the open end 22, by securing the portion 66 of the bracket within the socket means 68 and 70 and by attaching the arms 72 and 74 to the brackets 50 and 52, as shown in Figure 7. The desired portion of the block to be severed is projected from the container through the open end by applying finger pressure to the arms 40 and 42, with the hand that is holding the container. A finger of the other hand is then used to depress the finger piece 94 and to move the sleeves downwardly on the rod elements and force the cutter 92 through the protruding portion of the block. The severed portion will slide over the forward face of the vertical portion 64 of the bracket. Thus, it can be seen that the container 12 serves the functions of a holder, storage dish and holder and feeder in association with the cutter assembly 54. As shown in Figure 2, the container is used as the holder, and is designed to apply the protruding portion of the butter stick or block to an object, such as a pan, ear of corn or the like. As shown in Figure 3, by merely reversal of the position of the cover 24, the container can function as a storage dish for the stick or block of butter. Again, as shown in Figure 1, by placing the cover 24 on the container, so that the end 22 is exposed and by attaching the cutter assembly 54 to the container, at the open end 22, the container 12 can function as a holder and feeder for feeding the stick or block of butter through the open end, so that the desired portion thereof can be severed by the manual operation of the cutter assembly.

While the preferred form of this invention has been described herein and illustrated in the accompanying drawings, it is to be understood that such is merely by way of example and that other forms may be realized, as come within the scope of the appended claims.

What is claimed is:

1. A container for a block or stick of butter or the like comprising an elongated housing having a bottom wall, upstanding side walls and an end wall, said housing having an open top and an open end, a cover having means securing it over the top, a follower plate slidably depending from the cover positioned in the housing with its front face behind and in contact with the block to move the block out through the open end of the housing and means carried by said plate and disposed slightly in advance thereof and coplanar therewith anchoring the inner end of the block to the front face of the follower plate.

2. A butter or cheese cutter comprising an elongated housing having a bottom wall, upstanding side walls and an end wall, said housing having an open top and an open end, a cover having means for securing it over the top, a follower plate slidably depending from the cover and positioned in the housing with its front face behind and in contact with the block to move the block out through the open end of the housing, means carried by said plate disposed slightly in advance thereof and coplanar therewith to anchor the inner end of the block to the front face of the follower plate, a pair of rod elements positioned perpendicularly of the container and secured to the sides thereof at the open end, a transverse plate connecting the lower ends of the rod elements, a bracket upstanding from the plate and having an upper substantially horizontal end, means provided on the bottom wall of the container on which the upper end of the bracket is detachably mounted, mounting means carried by the upper ends of the rod elements, bracket elements laterally outstanding from the side walls of the container at the upper edges thereof, means detachably securing the mounting arms to the bracket elements, sleeve means slidably mounted on each rod element, a coil spring connected between one of the sleeve means and one of the mounting arms, a cutter means extending across the open end of the container and connected to the sleeve means, a cross bar connected to the sleeve means to permit the sliding movement of the sleeve means, and manually operable means connected to one of the sleeve means for sliding the sleeve means downwardly on the rod elements and moving the cutter means against the urging of the spring through a protruding portion of the block to sever said portion from the block.

3. A butter or cheese cutter comprising an elongated housing having a bottom wall, upstanding side walls and an end wall, said housing having an open top and an open end, a cover having means for securing it over the top, a follower plate slidably depending from the cover and positioned in the housing with its front face behind and in contact with the block to move the block out through the open end of the housing, means carried by said plate disposed slightly in advance thereof and coplanar therewith to anchor the inner end of the block to the front face of the follower plate, a pair of rod elements positioned perpendicularly of the container and secured to the sides thereof at the open end, a transverse plate connecting the lower ends of the rod elements, a bracket upstanding from the plate and having an upper substantially horizontal end, means provided on the bottom wall of the container on which the upper end of the bracket is mounted, mounting means carried by the upper ends of the rod elements, bracket elements laterally outstanding from the side walls of the container at the upper edges thereof, means detachably securing the mounting arms to the bracket elements, sleeve means slidably mounted on each rod element, a coil spring connected between one of the sleeve means and one of the mounting arms, a cutter extending across the open end of the container and connected to the sleeve means, a cross bar connected to the sleeve means to permit the sliding movement of the sleeve means, and manually operable means connected to one of the sleeve means for sliding the sleeve means downwardly on the rod elements and moving the cutter against the urging of the spring through a protruding portion of the block to sever said portion from the block, said bracket having a vertical portion upstanding from the plate in advance of the open end and extending up to the bottom wall, said vertical portion being disposed in advance of the rod elements to prevent the severed portion of the block from coming in contact with the rod elements or sleeve means.

References Cited in the file of this patent
UNITED STATES PATENTS

| | | |
|---|---|---|
| 1,005,128 | Blain | Oct. 10, 1911 |
| 1,595,097 | Howell | Aug. 10, 1926 |
| 1,917,480 | Widing | July 11, 1933 |
| 2,251,844 | Keefer | Aug. 5, 1941 |
| 2,580,864 | Upright | Jan. 1, 1952 |
| 2,650,428 | Epperson | Sept. 1, 1953 |
| 2,723,454 | Janossy | Nov. 15, 1955 |
| 2,737,721 | Hart | Mar. 13, 1956 |